United States Patent Office 2,912,308
Patented Nov. 10, 1959

2,912,308

PREPARATION OF MONO-SILANE

James H. Lorenz, Eggertsville, and Fred R. Whaley, Kenmore, N.Y., assignors to Union Carbide Corporation, a corporation of New York No Drawing. Application May 14, 1956
Serial No. 584,470

11 Claims. (Cl. 23—204)

This invention relates to silicon chemistry, and more particularly to a process for the preparation of mono-silane, $SiH_4$.

Due to their highly reactive characteristics, silanes, and mono-silanes in particular, are extremely useful intermediates in the synthesis of many organo-silicon compounds. For example, silanes may be readily halogenated to the corresponding halo-silane derivatives. The atoms of these latter compounds may then be replaced by alkoxy and aroxy groups through reaction with the corresponding alcohol or phenol. Hydrocarbon groups may also be attached directly to the silicon atoms of the halosilane derivatives by reaction with zinc alkyls, with mercury aryls, with sodium alkyls and aryls, and with the organo-magnesium halides or Grignard reagents. As a consequence of their adaptability to these and other chemical processes, the production of silanes has been the subject of considerable research by prior workers in the field of silicon chemistry.

Silanes have heretofore been prepared by reactions between: (1) silicides and mineral acids; (2) silicides and ammonium bromide; (3) lithium aluminum hydride and silicon chlorides; and (4) by the disproportionation of higher silanes. These processes, however, possess certain adverse characteristics which prevent their satisfactory utilization for the commercial production of monosilane. For example, the processes in some instances represent prohibitively expensive procedures due to operational requirements, or to the necessary use of scarce reactants. In others, the resulting yields of mono-silane have been too low to justify application of the processes for this particular purpose. Moreover, these processes usually result in the co-production of varying proportions of higher silanes, viz: di- and tri-silanes, $Si_2H_6$ and $Si_3H_8$. Subsequent separation techniques would therefore be required to obtain relatively pure mono-silane.

It is an object of the present invention to overcome the disadvantages of the prior art by providing an improved process for the selective production of mono-silane whereby good yields of the desired product may be obtained substantially free from the presence of higher silanes.

It is a further object of the present invention to provide a process for the production of mono-silane which will permit the utilization of readily available reactants, and which may be performed in the absence of extreme temperatures and pressures which would otherwise necessitate the use of costly and complex equipment capable of producing and withstanding them.

According to the present invention, siloxene, $Si_6O_3H_6$, is reacted with ammonia. This reaction results in the formation or evolution of gaseous mono-silane, which may then be readily collected. Prepared in this manner, the mono-silane evolved is not contaminated by the substantial presence of higher silanes, and yields are of sufficient quantity to warrant application of the process.

Good yields of mono-silane are obtained when the siloxene to be utilized in the production of mono-silane is initially prepared by reacting a metal disilicide with aqueous mineral acid in the presence of an alcohol. For efficient results, calcium disilicide, $CaSi_2$, is employed as an initial reactant in this process. Among other metal disilicide also capable of reacting with an alcoholic mineral acid to produce siloxene are the disilicides of barium and strontium.

The metal disilicide may be reacted with an aqueous solution of concentrated hydrochloric acid diluted with ethanol. Other acids suitable for this reaction are sulfuric and glacial acetic acids. The alcohol employed may also be any other lower aliphatic alcohol, such as methanol, propanol or butanol.

The lower aliphatic alcohols find advantageous utilization in concentrations of from 90 to 97 percent, by weight of reaction mixture. Alcohol concentrations outside this range, however, may also be of benefit to the reaction process.

Of primary importance to the preparation of siloxene in the manner heretofore described, for the purposes of the present invention, is the atomic ratio of acidic hydrogen to metal in which the reactants are initially present in the reaction mixture. Variations in this proportion have been found to directly affect the yield of mono-silane resulting from the subsequent treatment of the prepared siloxene with ammonia. The following table, based upon reactions between calcium disilicide and hydrochloric acid will better serve to illustrate the effect of this variation. For each run, siloxene was prepared utilizing an acidic hydrogen to metal atomic ratio as shown in the table. The siloxene so formed was subsequently reacted with ammonia, as hereinafter described, to yield mono-silane. The yields of mono-silane were calculated in a manner described in the examples set forth below.

| Preparation of $Si_6O_3H_6$, Acidic Hydrogen/Ca Atomic Ratio | Reaction of $Si_6O_3H_6$ with $NH_3$, Percent Yield of $SiH_4$ Based Upon Available Silicon |
|---|---|
| 2.0/1 | 14.6 |
| 2.0/1 | 15.1 |
| 2.0/1 | 17.8 |
| 6.5/1 | 18.4 |
| 8.1/1 | 29.0 |
| 8.1/1 | 30.0 |
| 10.0/1 | 33.1 |
| 10.0/1 | 37.2 |
| 10.0/1 | 37.4 |
| 12.2/1 | 19.4 |
| 12.2/1 | 19.1 |
| 18.0/1 | 23.6 |

The atomic ratio of acidic hydrogen to metal in which the reactants are preferably present lies between 8 to 1 and 11 to 1, inclusive. Within this range, mono-silane yields greater than 25 percent may be expected. The subsequent reaction of siloxene with ammonia, where the siloxene has been prepared by proportions beyond this range, may result in less than optimum yields of mono-silane.

The reaction between a metal disilicide and alcoholic mineral acid, forming siloxene, may be satisfactorily performed at temperatures ranging from 0° C. to 95° C. Generally, however, the reaction velocity at room temperature is such as to be adequate in most cases. Occasional agitation should be applied during the reaction to insure the complete dispersion of, and contact between reactants. The reactant is desirably allowed to proceed to completion, evidenced by the cessation of hydrogen evolution which accompanies the formation of siloxene. Siloxene is thereby precipitated as a grey powder, and is then suitably separated and prepared for subsequent conversion to mono-silane.

In a preferred embodiment of the invention, siloxene, prepared in the manner described, is subsequently reacted with ammonia. Siloxene obtained by other means, or from other sources, may also find suitable application in the present process. It has been found, however, that silane yields resulting therefrom usually are quantitatively below those obtained by the preferred method.

Siloxene may be reacted with either liquid or vaporous ammonia. The use of liquid ammonia is especially to be desired since it permits a more intimate contact between reactants. The reaction time required for completion is thereby decreased, and amounts of monosilane produced advantageously affected.

The treatment of siloxene with ammonia is necessarily perform in a manner inhibiting the spontaneous oxidation of siloxene or mono-silane. Accordingly, an inert atmosphere must be maintained in the reaction system. The inert gases, argon or helium in particular, may be used to assist in the maintenance of this inert atmosphere whenever carriers for the reactants are found desirable or necessary. Following the introduction of reactants, the reaction system may be effectively evacuated to further insure the absence of a combustion supporting atmosphere, at the same time aiding the evolution of monosilane. Other methods of assuring the presence of this inert atmosphere may also be employed.

The conversion of siloxene to mono-silane may be performed at a temperature of at least $-33°$ C., higher temperatures engendering increased yields of the desired product. The reaction temperature must, however, be lower than the decomposition temperature of the reactants or the reaction product. In conformance therewith, the reaction mixture is raised to at least the minimal temperature of $-33°$ C. At this temperature monosilane is evolved and ammonia simultaneously vaporized. Thereafter, any means of separating mono-silane from the other reaction products, i.e. from hydrogen and ammonia vapor, convenient to the operation, may be performed.

For example, mono-silane and ammonia may be solidified in a liquid nitrogen-cooled trap, leaving hydrogen in the gas phase. This hydrogen vapor may then be measured and removed. Subsequently raising the temperature of the solid phase to the boiling point of monosilane, $-112°$ C., will permit the evolution of monosilane, while ammonia remains as a solid.

The reaction between siloxene and liquid ammonia may be performed at higher temperatures by elevating the boiling point of the ammonia. A recommended method permitting an increase in reaction temperature while maintaining ammonia in a liquid phase is by the addition of an ammonium salt such as ammonium iodide to the reaction mixture preferably in proportions of up to approximately 30 percent by weight of reaction mixture. Among other additives equally suitable for this purpose are ammonium bromide and ammonium chloride. In addition, other operational techniques, such as the use of pressure, may similarly be utilized to improve mono-silane yields.

This invention will be illustrated in greater detail by description in connection with the following specific examples of its practice, but is not to be necessarily so limited.

*Example I*

Siloxene was prepared in a manner preferred by the invention by adding 6.7 grams of calcium disilicide (0.05 mole) to a solution of 41.5 milliliters of concentrated hydrochloric acid (0.50 mole) in 1000 milliliters of ethanol. This corresponds to an acidic hydrogen to metal atomic ratio of 10 to 1. The reaction mixture was allowed to stand at room temperature for 17 hours while being continually agitated. At the completion thereof, a grey precipitate, siloxene, formed, which was separated by filtration, washed with ethanol, and transferred while moist to be vacuum dried at 60° C.

1.2031 grams of siloxene prepared in the above manner was weighed in argon in a sample holder which was then attached to a system consisting of a glass trap reactor with provision for introducing the charge of siloxene, two manometers, a glass trap cooled by liquid nitrogen, a gas measuring burette, and a vacuum pump. Approximately 16 milliliters of liquid ammonia was condensed from a cylinder into the reactor at $-50°$ C. The siloxene was then introduced to the reactor. The system was suitably evacuated and the reactor allowed to warm up to $-33°$ C. As the reaction proceeded, the evolved mono-silane and vaporized ammonia were condensed in the liquid nitrogen-cooled trap, leaving any evolved hydrogen in the gas phase. The hydrogen was measured and pumped off. The trap containing monosilane and ammonia was then warmed up to $-112°$ C. by the substitution of trichloromonofluoromethane (Freon 11), at its freezing point, for liquid nitrogen. At this temperature the mono-silane was vaporized and measured, while ammonia remained as a solid in the trap. A pressure of 263 millimeters in 823.8 cubic centimeters was found due to silane vapor. This is equivalent to 0.141 gram of mono-silane, and calculates to a 37.4 percent yield based on available silicon, i.e. silicon present as calcium disilicide. A mass survey in a mass spectrometer showed the presence of over 96 percent mono-silane in this yield and less than 0.1 percent of higher silanes.

*Example II*

Using the same reaction system described in Example I, 2 grams of ammonium iodide were added to the reactor prior to condensing in the 16 cubic centimeters of ammonia. 0.8099 gram of siloxene, prepared by utilizing an acidic hydrogen to metal atomic ratio of 18 to 1, was added to the reactor, the system evacuated and the temperature of the reaction mixture was raised to $+20°$ C. At this temperature a liquid system was still maintained, and reaction proceeded. After the hydrogen was measured and pumped off, a pressure of 140 millimeters in 461 cubic centimeters was found due to mono-silane. This calculates to a 29.3 percent yield based on available silicon.

*Example III*

A sample of 0.4788 gram of siloxene, prepared in a manner preferred by the invention, was charged into a 1-inch Vycor tube which was attached to a system consisting of a 1-inch tube furnace, 2 mercury back-pressure traps, and a liquid nitrogen-cooled glass trap. A flow of ammonia, with helium as a carrier, was then started and the system subsequently heated to a temperature of $+350°$ C. for 30 minutes. The ammonia and evolved silane were collected in the cold trap and transferred to a gas measuring system. 55 millimeters pressure in 797 cubic centimeters was noted, and calculates to a monosilane yield of 31.6 percent based upon available silicon.

What is claimed is:

1. A process for the production of mono-silane which comprises reacting siloxene with anhydrous liquid ammonia in an inert atmosphere, at a temperature of at least $-33°$ C.

2. A process for the production of mono-silane which comprises treating siloxene with anhydrous liquid ammonia in an inert atmosphere, at a temperature of at least $-33°$ C. and recovering mono-silane from the reaction products.

3. A process for the production of mono-silane which comprises reacting siloxene with anhydrous liquid ammonia in an inert atmosphere, at a temperature of at least $-33°$ C. and recovering mono-silane from the reaction products by fractional vaporization.

4. A process for the production of mono-silane which comprises reacting siloxene with anhydrous liquid ammonia in an inert atmosphere, at a temperature above −33° C., wherein said ammonia is maintained in liquid phase at a temperature exceeding its standard boiling point and recovering mono-silane from the reaction products.

5. A process for the production of mono-silane which comprises reacting siloxene with anhydrous liquid ammonia in an inert atmosphere, at a temperature above −33° C., wherein said ammonia is maintained in liquid phase at a temperature exceeding its standard boiling point by the addition of an ammonium salt to the reaction mixture and recovering mono-silane from the reaction products.

6. A process for the production of mono-silane which comprises reacting siloxene with anhydrous liquid ammonia in an inert atmosphere, at a temperature above −33° C., wherein said ammonia is maintained in liquid phase at a temperature exceeding its standard boiling point by the addition of an ammonium salt to the reaction mixture in proportions of not more than 30 percent by weight of reaction mixture and recovering mono-silane from the reaction products.

7. A process according to claim 6 wherein said ammonium salt is an ammonium halide.

8. A process according to claim 6 wherein said ammonium salt is ammonium iodide.

9. A process according to claim 6 wherein said ammonium salt is ammonium bromide.

10. A process according to claim 6 wherein said ammonium salt is ammonium chloride.

11. A process for the production of mono-silane which comprises reacting at least one metal disilicide selected from the group consisting of calcium, barium, and strontium disilicide, with aqueous mineral acid in the presence of alcohol, said acid and metal disilicide being present in an acidic hydrogen to metal atomic ratio of between 8 to 1 and 11 to 1, separating the siloxene thereby precipitated, treating said siloxene with anhydrous liquid ammonia in an inert atmosphere at a temperature of at least −33° C., and recovering mono-silane from the reaction products.

References Cited in the file of this patent

FOREIGN PATENTS 926,069    Germany _____ Apr. 4, 1955

OTHER REFERENCES

Fritz: "Chemical Abstracts," vol. 48, p. 5704 (May 25, 1954).

Kautsky: "Zeitschrift für Anorganische Chemie," vol. 117, pages 209–217 (1921).

Mellor: "Comprehensive Treatise on Inorganic and Theoretical Chemistry," 1925, vol. 6, pages 216–218.

UNITED STATES PATENT OFFICE
CERTIFICATE OF CORRECTION

Patent No. 2,912,308                                November 10, 1959

James H. Lorenz et al.

It is hereby certified that error appears in the printed specification of the above numbered patent requiring correction and that the said Letters Patent should read as corrected below.

Column 2, line 66, for "reactant" read -- reaction --; column 3, line 15, for "perform" read -- performed --; column 4, line 3, for "grams" read -- Grams --; line 36, for "gram" read -- Gram --; column 4, line 56, for "millimeters" read -- Millimeters --.

Signed and sealed this 14th day of June 1960.

(SEAL)
Attest:
KARL H. AXLINE                                    ROBERT C. WATSON
Attesting Officer                                Commissioner of Patents